__United States Patent__ [19]

(12) United States Patent     (10) Patent No.:    US 7,809,821 B2
Bade et al.                           (45) Date of Patent:    *Oct. 5, 2010

(54) TRUST EVALUATION

(75) Inventors: Steven A. Bade, Georgetown, TX (US); Andrew G. Kegel, Redmond, WA (US); Leendert P. Van Doorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/913,193

(22) PCT Filed: Feb. 16, 2007

(86) PCT No.: PCT/US2007/062315

§ 371 (c)(1), (2), (4) Date: Oct. 31, 2007

(87) PCT Pub. No.: WO2007/098406

PCT Pub. Date: Aug. 30, 2007

(65) Prior Publication Data

US 2009/0006597 A1    Jan. 1, 2009

(51) Int. Cl.
*G06F 15/173* (2006.01)
*G06F 15/16* (2006.01)
*G06F 11/30* (2006.01)
*G21C 17/00* (2006.01)

(52) U.S. Cl. .................. 709/223; 709/217; 709/202; 702/182

(58) Field of Classification Search .............. 709/223, 709/202, 217; 702/182
See application file for complete search history.

(56) References Cited

U.S. PATENT DOCUMENTS

| 2003/0056114 | A1 | 3/2003 | Goland |
| 2003/0074548 | A1 | 4/2003 | Cromer et al. |
| 2004/0088369 | A1* | 5/2004 | Yeager et al. ............ 709/217 |
| 2004/0133640 | A1 | 7/2004 | Yeager et al. |
| 2005/0033991 | A1 | 2/2005 | Crane |
| 2005/0086300 | A1 | 4/2005 | Yeager et al. |

(Continued)

FOREIGN PATENT DOCUMENTS

EP        1225513 A1    7/2002

(Continued)

OTHER PUBLICATIONS

International Search Report for PCT Application No. 07/62315; Feb. 22, 2008.

(Continued)

*Primary Examiner*—Jefferey F Harold
*Assistant Examiner*—Stephanie Chang
(74) *Attorney, Agent, or Firm*—Brian Verminski; Hoffman Warnick LLC

(57) ABSTRACT

A solution for evaluating trust in a computer infrastructure is provided. In particular, a plurality of computing devices in the computer infrastructure evaluate one or more other computing devices in the computer infrastructure based on a set of device measurements for the other computing device(s) and a set of reference measurements. To this extent, each of the plurality of computing devices also provides a set of device measurements for processing by the other computing device(s) in the computer infrastructure.

17 Claims, 4 Drawing Sheets

U.S. PATENT DOCUMENTS

| | | |
|---|---|---|
| 2005/0091338 A1 | 4/2005 | De La Huerga |
| 2005/0138417 A1 | 6/2005 | McNerney et al. |
| 2005/0177716 A1 | 8/2005 | Ginter et al. |
| 2005/0256679 A1 | 11/2005 | Kanevsky et al. |
| 2005/0283601 A1 | 12/2005 | Tahan |
| 2006/0005000 A1 | 1/2006 | King et al. |
| 2006/0005063 A1 | 1/2006 | Patrick et al. |
| 2006/0155988 A1 | 7/2006 | Hunter et al. |
| 2006/0224903 A1 | 10/2006 | Ginter et al. |

FOREIGN PATENT DOCUMENTS

| | | |
|---|---|---|
| GB | 2420432 A | 5/2006 |

OTHER PUBLICATIONS

"Project: Open Source Tripwire: Summary," printed from http://sourceforge.net/projects/tripwire on Nov. 7, 2005.

"Strider GhostBuster Rootkit Detection," printed from http://research.microsoft.com/rootkit on Nov. 7, 2005.

* cited by examiner

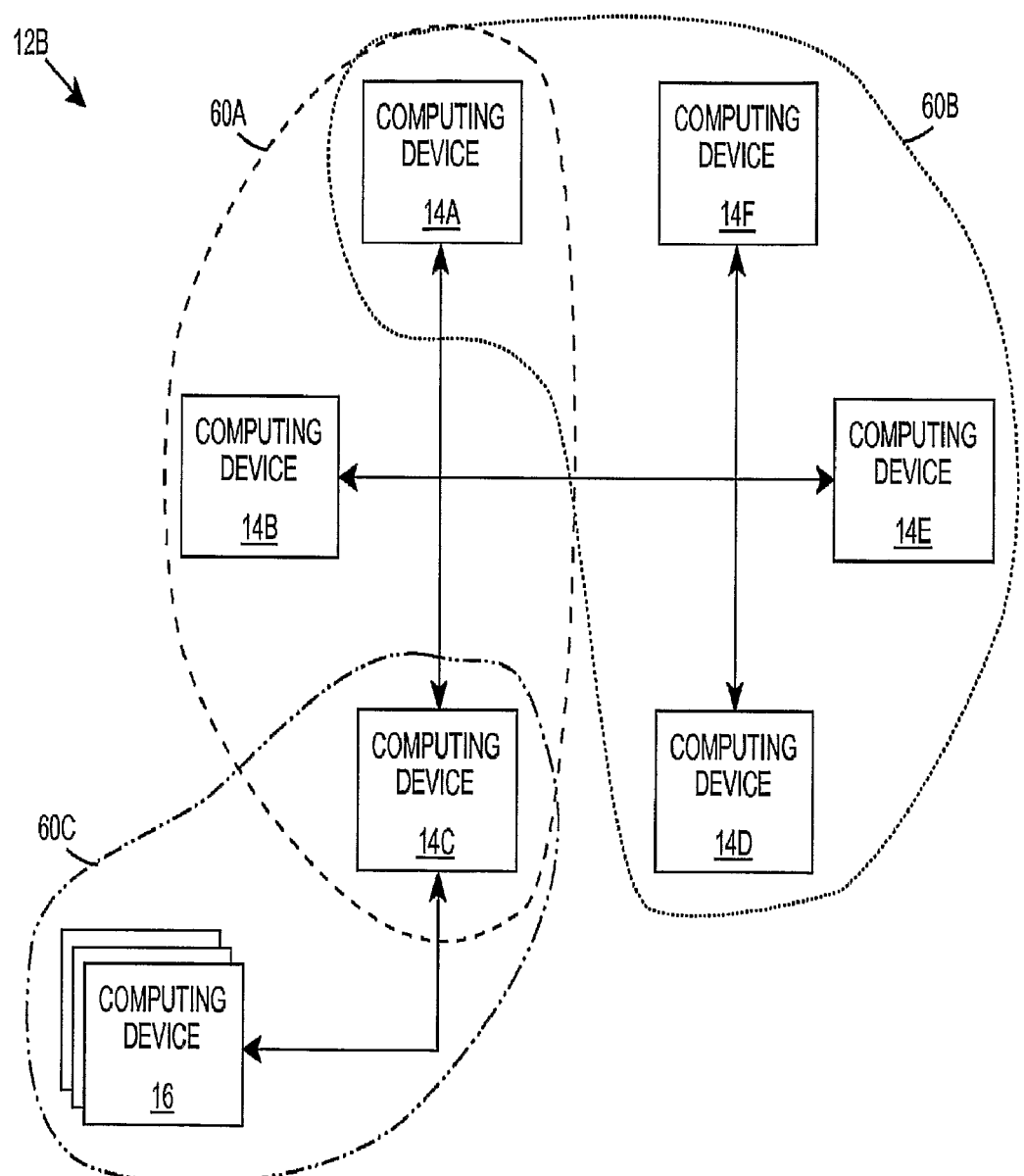

TRUST EVALUATION

REFERENCE TO PRIOR APPLICATIONS

The current application is a U.S. national stage application of International Application No. PCT/US07/62315, which claims priority to U.S. Utility application Ser. No. 11/355,719, which was filed on 16 Feb. 2006, and which has issued as U.S. Pat. No. 7,266,475, both of which are hereby incorporated by reference.

FIELD OF THE INVENTION

The invention relates generally to trust evaluation, and more particularly, to a solution for evaluating trust between a plurality of computing devices in a computer infrastructure.

BACKGROUND OF THE INVENTION

It is becoming increasingly important that a computer that seeks to communicate with another computer be able to ensure that the other computer can be trusted. For example, information for financial transactions and other sensitive information are increasingly being transferred between computers over public networks such as the Internet. In order to ensure the authenticity and security of this data, it is important that a level of trust be established between the sending and receiving computers.

To meet this need various solutions have been proposed. For example, the Trusted Computing Group (TCG) has defined a set of specifications for establishing trust between two or more computing devices, which are hereby incorporated herein by reference. The specifications define a set of information (e.g., measurements) that are maintained by a computing device and a solution for maintaining and communicating these measurements in a secure manner. The measurements represent the components of the computing device and the configuration thereof. For example, the measurements typically reflect the various pieces of a basic input output system (BIOS) and firmware that are implemented on the computing device as well as the configuration information that controls the behavior of these pieces (e.g., "BIOS settings"). The measurements also reflect the hardware itself, such as a type and version of a processor, a size of the main memory, types of peripheral controllers present in input/output (I/O) bus slots, and/or the like. The measurements are kept in a "log" that is secured by a set of Program Configuration Registers (PCRs). The PCRs serve as cryptographic proof that the log is intact and has not been tampered.

FIG. 1 shows a prior art computing infrastructure 100 for evaluating trust between computing devices 102 and 104. Using the TCG architecture as an exemplary solution, validation system 106 on computing device 102 (e.g., "the challenger") requests an attestation from another computing device 104. The attestation comprises the measurements and the corresponding PCR values (e.g., device measurements 110) combined and cryptographically signed by an attestation system 108 of the computing device 104. In the TCG architecture, attestation system 108 is referred to as a Trusted Platform Module (TPM), and comprises a chip built into a motherboard for computing device 104. Subsequently, validation system 106 evaluates the attestation using a set of reference measurements 112, which represent all approved results. If the evaluation indicates that the computing device 104 may have been tampered with, a transaction can be aborted before any sensitive information is exchanged. Otherwise, the transaction can proceed with computing device 102 having established a certain level of trust with computing device 104.

In another application, the TCG architecture can be used to ensure that various computing devices 104 conform to an appropriate policy. To this extent, computing device 102 can be used by a system administrator or the like, and can query multiple computing devices 104 in a network and compare the device measurements 110 received for each computing device 104 to a "golden master" set of reference measurements 112. In this case, if device measurements 110 match reference measurements 112, the corresponding computing device 104 is considered conformant and/or trustworthy. However, when device measurements 110 do not match reference measurements 112, the corresponding computing device 104 can be isolated from the remaining computing devices 104 and/or repaired.

Since the process of validating measurements must account for variability in the measurements received from various computing devices 104, e.g., different ordering of entries in a log, the validation process can be very complex. As a result, current solutions provide a centralized approach, in which a single computing device 102, often with the direct interaction of a system administrator, evaluates numerous other computing devices 104 and/or provides any required fixes. However, these solutions do not scale well and are subject to failures and/or delays that create security lapses.

To this extent, a need exists for a solution for evaluating trust in a computer infrastructure that addresses the problems discussed herein and/or other problems recognizable by one in the art.

SUMMARY OF THE INVENTION

The invention provides a solution for evaluating trust in a computer infrastructure. In particular, a plurality of computing devices in the computer infrastructure evaluate one or more other computing devices in the computer infrastructure based on a set of device measurements for the other computing device(s) and a set of reference measurements. To this extent, each of the plurality of computing devices also provides a set of device measurements for processing by the other computing device(s) in the computer infrastructure. The evaluations can be performed using a small amount/excess computing capacity of each computing device. When the number of computing devices in the computer infrastructure becomes too great, a plurality of sub-groups can be created in which computing devices only evaluate other computing devices in the same sub-group(s). In this manner, a distributed, efficient and scalable solution is provided for evaluating trust in a computer infrastructure.

A first aspect of the invention provides a system for evaluating trust in a computer infrastructure, the system comprising: on each of a plurality of computing devices in the computer infrastructure: a system for providing device measurements for the computing device for processing by another computing device in the computer infrastructure; and a system for evaluating another computing device in the computer infrastructure based on a set of device measurements for the another computing device and a set of reference measurements.

A second aspect of the invention provides a method of evaluating trust in a computer infrastructure, the method comprising: on each of a plurality of computing devices in the computer infrastructure: periodically providing device measurements for the computing device for processing by another computing device in the computer infrastructure; and periodically evaluating another computing device in the computer infrastructure based on a set of device measurements for the another computing device and a set of reference measurements.

A third aspect of the invention provides a computer infrastructure comprising: a plurality of computing devices, each of the plurality of computing devices including: a system for providing device measurements for the computing device for processing by another computing device in the computer infrastructure; and a system for evaluating another computing device in the computer infrastructure based on a set of device measurements for the another computing device and a set of reference measurements.

A fourth aspect of the invention provides a program product stored on a computer-readable medium, which when executed, enables a computer infrastructure to evaluate trust, the program product comprising computer program code for enabling a computing device in the computer infrastructure to: periodically provide device measurements for the computing device for processing by another computing device in the computer infrastructure; and periodically evaluate another computing device in the computer infrastructure based on a set of device measurements for the another computing device and a set of reference measurements.

A fifth aspect of the invention provides a method of deploying a system for evaluating trust in a computer infrastructure, the method comprising: providing a computer infrastructure that comprises: a plurality of computing devices, each of the plurality of computing devices operable to: provide device measurements for the computing device for processing by another computing device in the computer infrastructure; and evaluate another computing device in the computer infrastructure based on a set of device measurements for the another computing device and a set of reference measurements.

A sixth aspect of the invention provides a business method for evaluating trust in a computer infrastructure, the business method comprising managing a computer infrastructure that performs the process described herein; and receiving payment based on the managing.

A seventh aspect of the invention provides a business method for managing trust evaluation reporting in a computer infrastructure, the business method comprising managing a computer infrastructure that performs the process described herein; and receiving payment based on the managing.

The illustrative aspects of the present invention are designed to solve the problems herein described and other problems not discussed, which are discoverable by one in the art.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which:

FIG. 4 shows an illustrative computer infrastructure that includes multiple sub-groups.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a solution for evaluating trust in a computer infrastructure. In particular, a plurality of computing devices in the computer infrastructure evaluate one or more other computing devices in the computer infrastructure based on a set of device measurements for the other computing device(s) and a set of reference measurements. To this extent, each of the plurality of computing devices also provides a set of device measurements for processing by the other computing device(s) in the computer infrastructure. The evaluations can be performed using a small amount/excess computing capacity of each computing device. When the number of computing devices in the computer infrastructure becomes too great, a plurality of sub-groups can be created in which computing devices only evaluate other computing devices in the same sub-group(s). In this manner, a distributed, efficient and scalable solution is provided for evaluating trust in a computer infrastructure.

Figure 1:
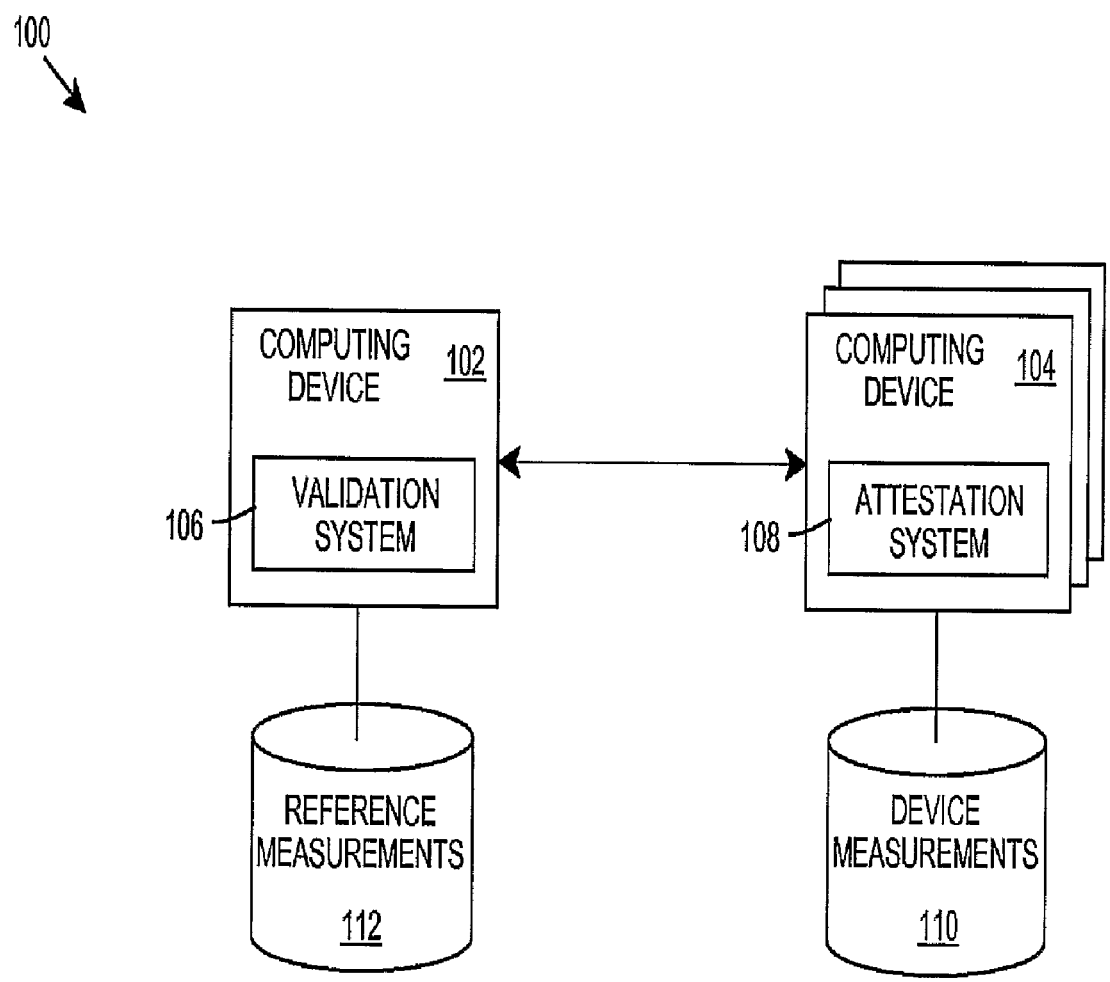
FIG. 1 shows a prior art computing infrastructure for evaluating trust.
Figure 2:
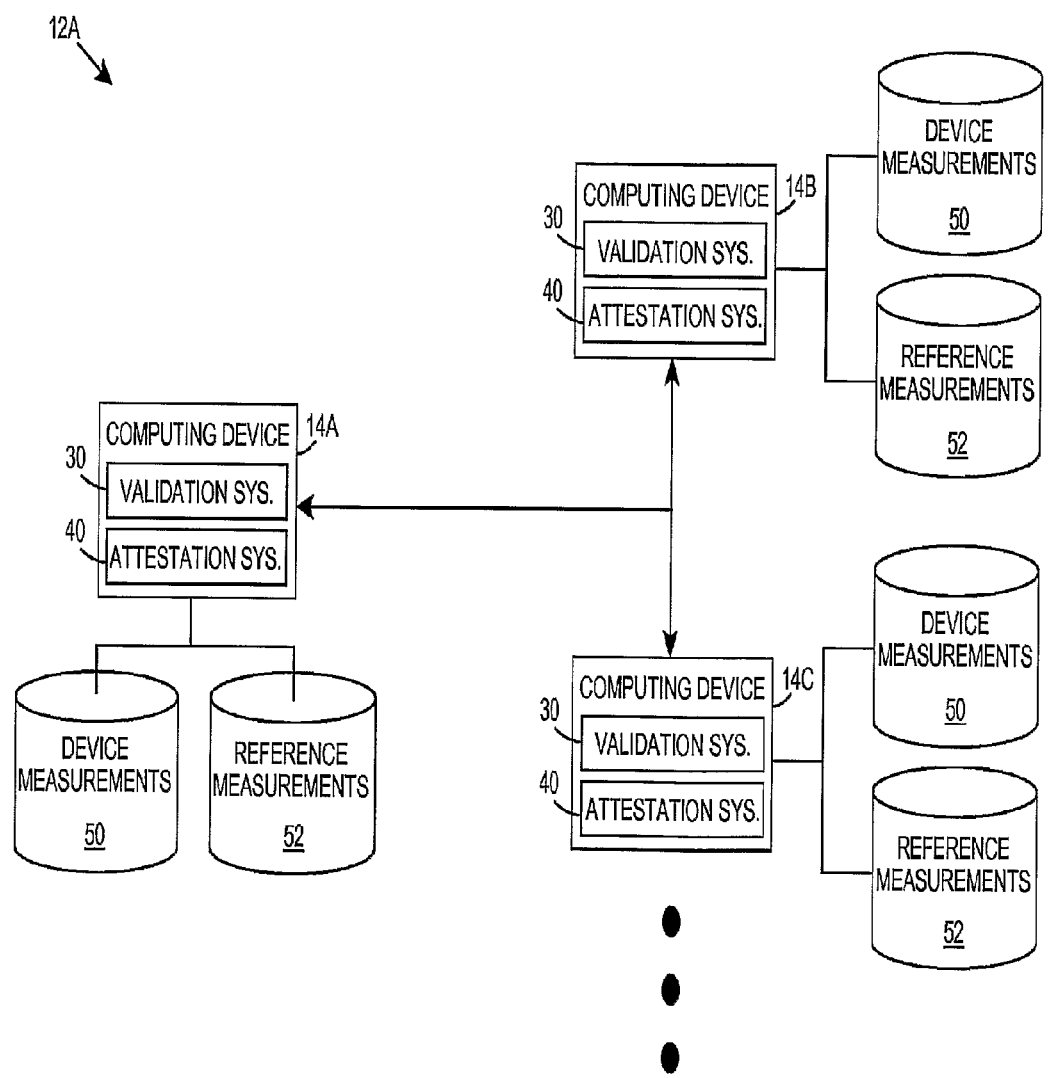
FIG. 2 shows an illustrative computing infrastructure for evaluating trust according to an embodiment of the invention.

Turning to the drawings, FIG. 2 shows an illustrative computer infrastructure 12A for evaluating trust according to an embodiment of the invention. Computer infrastructure 12A includes a plurality of computing devices 14A-C, each of which includes an attestation system 40 and a validation system 30, which make computing devices 14A-C operable to evaluate trust by performing the process described herein. In general, validation system 30 periodically evaluates the other computing devices 14A-C in computer infrastructure 12A. To this extent, validation system 30 can request and/or receive a set of device measurements 50 from attestation system 40 on the other computing devices 14A-C and compare the device measurements 50 to reference measurements 52. Based on this comparison, validation system 30 can evaluate the trustworthiness of the other computing devices 14A-C.

Computer infrastructure 12A can comprise any type of computing infrastructure 12A that includes a group of two or more computing devices 14A-C. To this extent, computing devices 14A-C can communicate over any combination of one or more types of communications links, such as a network, a shared memory, or the like, to perform the process described herein. The communications link(s) can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. In one embodiment, computer infrastructure 12A comprises a grid, and each computing device 14A-C comprises a server in the grid. However, it is understood that this is only illustrative of many possible embodiments.

Figure 3:
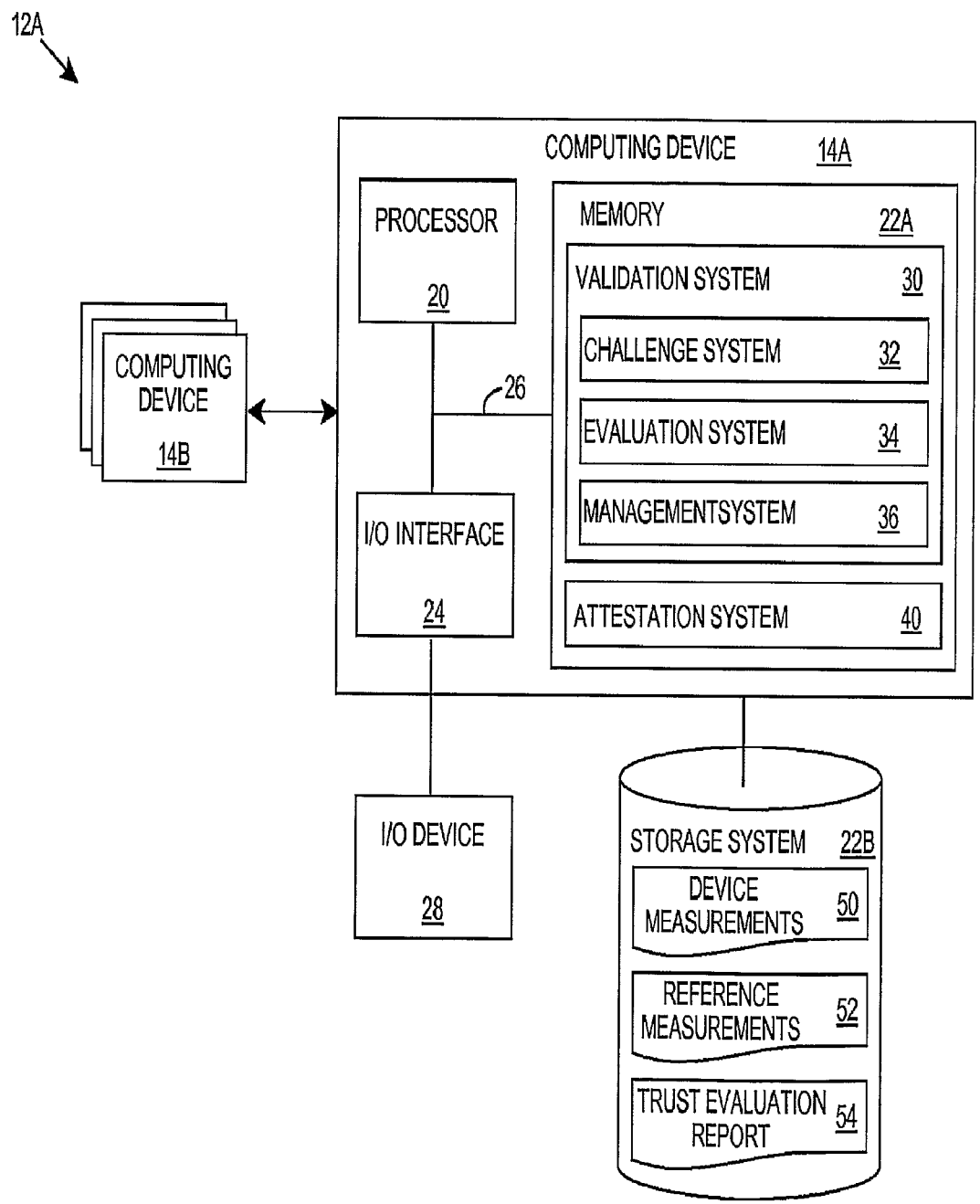
FIG. 3 shows a more detailed view of one of the computing devices of FIG. 2 according to an embodiment of the invention.

FIG. 3 shows a more detailed view of one of the computing devices 14A according to an embodiment of the invention. Computing device 14A is shown including a processor 20, a memory 22A, an input/output (I/O) interface 24, and a bus 26. Further, computing device 14A is shown in communication with an external I/O device/resource 28 and a storage system 22B. As is known in the art, in general, processor 20 executes computer program code, such as validation system 30, which is stored in memory 22A and/or storage system 22B. While executing computer program code, processor 20 can read and/or write data, such as device measurements 50, to/from memory 22A, storage system 22B, and/or I/O interface 24. Bus 26 provides a communications link between each of the components in computing device 14A. I/O device 28 can comprise any device that enables an individual to interact with computing device 14A or any device that enables computing device 14A to communicate with one or more other computing devices using any type of communications link.

In any event, computing device 14A can comprise any general purpose computing article of manufacture capable of executing computer program code installed thereon (e.g., a personal computer, server, handheld device, etc.). However, it is understood that computing device 14A, validation system 30 and attestation system 40 are only representative of various possible equivalent computing devices that may perform the process described herein. To this extent, in other embodiments, the functionality provided by computing device 14A, validation system 30 and attestation system 40 can be implemented by a computing article of manufacture that includes any combination of general and/or specific purpose hardware and/or computer program code. In each embodiment, the program code and hardware can be created using standard programming and engineering techniques, respectively. Regardless, it is understood that computing devices 14B-C (FIG. 2) can comprise the same components (processor, memory, I/O interface, etc.) as shown for computing device 14A. These components have not been separately shown and discussed for brevity.

As discussed further herein, validation system 30 and attestation system 40 enable each computing device 14A-B in computer infrastructure 12A to evaluate trust. To this extent, validation system 30 is shown including a challenge system 32, an evaluation system 34 and a management system 36. Operation of each of these systems is discussed further herein. However, it is understood that some of the various systems shown in FIG. 3 can be implemented independently, combined, and/or stored in memory for one or more separate computing devices that are included in computer infrastructure 12A. Further, it is understood that some of the systems and/or functionality may not be implemented, or additional systems and/or functionality may be included as part of computer infrastructure 12A.

Regardless, the invention provides a solution for evaluating trust in a computer infrastructure 12A. For example, computing device 14B can evaluate a level of trust for computing device 14A. To perform such an evaluation, computing device 14A is shown including an attestation system 40. Attestation system 40 provides a set of device measurements 50 for the corresponding computing device 14A for processing (e.g., evaluation) by another computing device 14B in computer infrastructure 12A. To this extent, attestation system 40 can comprise a Trusted Platform Module (TPM) and device measurements 50 can comprise the set of measurements and Program Configuration Registers (PCRs) as defined and described in the Trusted Computing Group's specifications. However, it is understood that this is only an illustrative embodiment, and numerous alternative embodiments are possible under the invention.

Similarly, computing device 14A can evaluate a level of trust for computing device 14B. In this case, validation system 30 can include a challenge system 32 that periodically requests device measurements 50 for other computing device(s) 14B in computer infrastructure 12A. In response, an attestation system 40 or the like in computing device 14B can provide the device measurements 50 for processing by the requesting computing device 14A. Challenge system 32 can request device measurements 50 from the other computing device(s) 14B using any type of event-based and/or timing-based solution. For example, a user, such as a system administrator, or another system can instruct challenge system 32 to request device measurements 50 for one or more computing devices 14B. Alternatively, challenge system 32 can request device measurements 50 after expiration of a period of time (e.g., once an hour), prior to providing sensitive data to the computing device 14B, upon detection of an abnormal event, and/or the like.

When challenge system 32 receives device measurements 50, evaluation system 34 can evaluate the corresponding computing device 14B based on the device measurements 50 to determine whether it can be trusted. In particular, evaluation system 34 can compare the device measurements 50 to a set of reference measurements 52. The set of reference measurements 52 can define a set of measurements and their corresponding trust level. The set of reference measurements 52 can be specific to a particular computing device 14B, e.g., reference measurements 52 can comprise device measurements 50 for each computing device 14B in computer infrastructure 12A, and/or reference measurements 52 can comprise a set of standard measurements that computing device(s) 14B in computer infrastructure 12A must meet in order to obtain a particular trust level.

In one embodiment, evaluation system 34 can assign computing device 14B one of a plurality of trust levels. For each increasing trust level, evaluation system 34 can perform a more exacting comparison of device measurements 50 with reference measurements 52. To this extent, another system can request that validation system 30 determine whether computing device 14B meets a particular trust level. In this case, challenge system 32 can obtain a corresponding amount and/or type of device measurements 50 based on the particular trust level and/or evaluation system 34 can perform a varying amount and/or type of evaluations of device measurements 50 with respect to reference measurements 52 based on the particular trust level.

Regardless, evaluation system 34 can detect a failure of the other computing device 14B to obtain a trust level. In this case, evaluation system 34 can respond to the failure. For example, evaluation system 34 can provide an indication of the failure to a requesting system and/or user, can generate a notification to a user of the failure, and/or can communicate the failure to the evaluated computing device 14B and/or one or more other computing devices 14C (FIG. 2) in computer infrastructure 12A.

When computer infrastructure 12A includes three or more computing devices 14A-C as shown in FIG. 2, evaluation system 34 can compare the evaluation of a particular computing device 14B with the other computing device(s) 14C in computer infrastructure 12A. For example, when evaluation system 34 detects a failure of a particular computing device 14B, evaluation system 34 can respond by comparing the evaluation with the evaluation result(s) for the particular computing device 14B that were obtained by the remaining computing device(s) 14C. Subsequently, any additional action can be determined using any voting algorithm or the like between the other computing devices 14A, 14C in computer infrastructure 12A.

In one embodiment, validation system 30 includes a management system 36 that manages a set (one or more) of computing devices 14B that are evaluated by validation system 30. To this extent, in response to a failure of a particular computing device 14B, management system 36 can isolate the computing device 14B from communicating with the rest of the computing devices 14C (FIG. 2) in computer infrastructure 12A and/or communicating with any other computing devices outside of computer infrastructure 12A.

Further, management system 36 can add and/or remove computing device(s) 14B that are evaluated by validation system 30. For example, management system 36 can receive a communications address or the like for computing device 14B and an instruction to add/remove computing device 14B from a system administrator and/or another system. Alternatively, management system 36 can automatically detect the presence of a new computing device 14B in computer infrastructure 12A and begin evaluating it. For example, a new computing device 14B can petition to join computer infrastructure 12A. As part of this process, the new computing device 14B can provide various information on its system, such as device measurements 50, which can be evaluated versus a known standard, and a particular trust level can be assigned. Further, when challenge system 32 does not receive a response to a request for device measurements 50 of a particular computing device 14B, management system 36 can remove the computing device 14B from the set of evaluated computing devices and/or isolate the computing device 14B as no longer being trusted.

When adding computing devices 14B to the set of computing devices being monitored, management system 36 can detect that a threshold number of computing devices being monitored has been exceeded. In this case, management system 36 can divide computer infrastructure 12A into a plurality of sub-groups of computing devices 14A-B for evaluating trust. To this extent, computer infrastructure 12A can comprise a sub-group of computing devices 14A-B. For example, FIG. 4 shows an illustrative computer infrastructure 12B that includes a plurality of sub-groups 60A-C. In this case, each computing device 14A-F only evaluates trust for the other computing devices 14A-F in the same sub-group 60A-C.

Management system 36 can use any threshold number to divide computer infrastructure 12B into a multiple sub-groups 60A-C. In general, each computing device 14A-F should be able to readily monitor the other computing devices in the same sub-group without substantially impacting a primary function of the computing device 14A-F. Consequently, the threshold number can be selected to ensure that the impact on the overall performance of computing devices 14A-F remains at an acceptable level. Similarly, management system 36 can detect when a number of computing devices in a sub-group 60A-C falls below a threshold number (e.g., three). In this case, management system 36 can combine two sub-groups 60A-C or independently assign each computing device 14A-F to another sub-group 60A-C.

In any event, management system 36 can implement any solution for assigning computing devices 14A-F in computer infrastructure 12B to a corresponding sub-group 60A-C. For example, management system 36 can assign computing devices 14A-F to different sub-groups 60A-C based on the communications addresses, physical proximity, primary function(s), and/or the like. Further, a user, such as a system administrator, can use management system 36 to designate membership in sub-groups 60A-C, add and/or remove computing devices 14A-F from sub-groups 60A-C, create and/or delete sub-groups 60A-C, and/or the like.

Sub-groups 60A-C can comprise disjoint membership, e.g., no computing device 14A-F is included in more than one sub-group 60A-C. However, as shown, one or more computing devices 14A-F can be included in multiple sub-groups 60A-C. For example, computing device 14A is shown included in both sub-group 60A-B and computing device 14C is shown included in both sub-groups 60A, C. By including computing devices 14A-F in multiple sub-groups 60A-C, redundancy is provided for computer infrastructure 12B and sub-groups 60A-C may need to be created/removed less frequently. To this extent, each computing device 14A-F can be included in two sub-groups 60A-C. In this case, each sub-group 60A-C can comprise a single computing device 14A-F that comprises a "trusted authority" from which other computing devices 14A-F in the sub-group 60A-C can obtain reference measurements 52 (FIG. 2). Should a trusted authority in one sub-group 60A-C become corrupted, the corruption can be detected by the other partially overlapping sub-groups 60A-C and trust evaluation can continue for the other computing devices 14A-F in the corrupted sub-group 60A-C.

While each computing device 14A-F is shown and described as including both validation system 30 (FIG. 2) and attestation system 40 (FIG. 2), it is understood that one or more computing devices 16 in computer infrastructure 12B can comprise only attestation system 40 or neither system 30, 40. For example, computing device 16 could comprise a computing device that includes a TPM. In this case, computing device 14C can evaluate the trust level of computing device 16 as described herein. However, computing device 16 would not evaluate the trust of computing device 14C or any other computing device in computer infrastructure 12B. Alternatively, computing device 16 may not include either system 30, 40. In this case, computing device 14C can use other solutions for evaluating computing device 16, limit the sensitivity of data communicated to computing device 16, and/or limit the types of transactions in which computing device 16 can participate.

Returning to FIG. 2, reference measurements 52 are critical to effectively evaluating other computing devices 14A-C in computer infrastructure 12A. In particular, any corruption or misrepresentation of reference measurements 52 could cause wide-spread disruption in computer infrastructure 12A. For example, insertion of a "bad" measurement into reference measurements 52 could allow unapproved software, such as a virus or other security attack, to execute on a computing device 14A-C, thereby defeating the evaluation process. As shown, each computing device 14A-C can include its own copy of reference measurements 52. This provides protection against a compromise of one copy of reference measurements 52 at one of computing devices 14A-C. Further, when voting, or the like, is used to determine a trust level for a computing device 14A-C that fails an evaluation, a compromised set of reference measurements 52 may be detected. In this case, validation system 30 can stop evaluating other computing devices 14A-C until an accurate set of reference measurements 52 is obtained.

One problem with each computing device 14A-C comprising its own copy of reference measurements 52 is the need to distribute reference measurements 52 to each computing device 14A-C. In an alternative embodiment, a single computing device, e.g., computing device 14A, could comprise a copy of reference measurements 52 and validation systems 30 on the other computing devices 14B-C could request and obtain data from reference measurements 52 using secure communications on an as needed basis. Regardless, reference measurements 52 should be generated and/or distributed in a trusted manner, e.g., using a "clean room" solution. To this extent, a single computing device 14A in computer infrastructure 12A can enable a user to add, delete, and/or modify reference measurements 52 using, for example, management system 36 (FIG. 3), and subsequently, management system 36 can communicate an updated reference measurements 52 to the other computing devices 14B-C in computer infrastructure 12A. Management system 36 on each of the other computing devices 14B-C can receive the updated reference measurements 52 and ensure that they are valid. In one embodiment, reference measurements 52 and validation system 30 are cryptographically signed by the creator and are only replaceable/updateable by trustworthy procedures that protect the integrity of the signed data and/or program code.

Validation system 30 and/or attestation system 40 can maintain a set of trust evaluation reports 54. Trust evaluation report 54 can comprise various data on the computing device(s) 14B that are evaluated by evaluation system 34, the results of the evaluation (s), response(s) to request(s) for device measurements 50, and/or the like. For example, in one embodiment, trust evaluation report 54 can comprise a change log that is updated each time the trust level of an evaluated computing device 14B changes. Similarly, trust evaluation report 54 can comprise an audit report that logs all evaluations, updates of device measurements 50 and/or reference measurements 52, requests for evaluation data and/or device measurements 50, and/or the like, that are processed by validation system 30 and/or attestation system 40. In any event, validation system 30 and/or attestation system 40 can provide some or all of a trust evaluation report 54 for processing by another system and/or display to a user.

While shown and described herein as a method and system for evaluating trust in a computer infrastructure, it is understood that the invention further provides various alternative embodiments. For example, in one embodiment, the invention provides a program product stored on a computer-readable medium, which when executed, enables a computer infrastructure to evaluate trust as described herein. To this extent, the computer-readable medium includes program code, such as validation system 30 (FIG. 3) and attestation system 40 (FIG. 3), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 3) and/or storage system 22B (FIG. 3) (e.g., a fixed disk, a read-only memory, a random access memory, a cache memory, etc.), and/or as a data signal traveling over a network (e.g., during a wired/wireless electronic distribution of the program product).

In another embodiment, the invention provides a method of generating a system for evaluating trust in a computer infrastructure. In this case, a computer infrastructure, such as computer infrastructure 12A (FIG. 2), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14A (FIG. 3), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as a network security service provider, could offer to evaluate trust in a computer infrastructure as described herein. Similarly, a service provider could offer to manage trust evaluation reporting in a computer infrastructure. In the latter case, the service provider can manage trust evaluation report(s) 54 for computer infrastructure 12A. Trust evaluation report(s) 54 can be used to ensure compliance with one or more laws and/or regulations. In either case, the service provider can manage (e.g., create, maintain, support, etc.) a computer infrastructure, such as computer infrastructure 12A (FIG. 2), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer infrastructure comprising:
a computing device including:
a system for managing a set of computing devices in the computer infrastructure that evaluate a trustworthiness of one another, the system for managing including: a system for managing membership in a sub-group of the computer infrastructure and a system for managing a trust level for communications between another computing device in the computer infrastructure and other computing devices;
wherein the system for managing membership in the sub-group of the computer infrastructure includes:
a system for detecting that a threshold number of computing devices has been exceeded for at least one of: the computer infrastructure or a sub-group of the computer infrastructure; and
a system for dividing the at least one of: the computer infrastructure or the sub-group of the computer infrastructure into a plurality of sub-groups of computing devices for evaluating trust.

2. The computer infrastructure of claim 1, the computing device further including a system for providing device measurements for the computing device for processing by another computing device in the computer infrastructure.

3. The computer infrastructure of claim 1, the computing device further including a system for evaluating another computing device in the computer infrastructure based on a set of device measurements for the another computing device and a set of reference measurements.

4. The computer infrastructure of claim 1, the system for dividing assigning at least one computing device in the computer infrastructure to a plurality of sub-groups.

5. The computer infrastructure of claim 1, wherein the threshold number is selected based on an impact of the monitoring on a performance of a primary function of each computing device.

6. The computer infrastructure of claim 1, the system for managing membership in a sub-group of the computer infrastructure including:
- a system for detecting that a number of computing devices in a sub-group of the computer infrastructure has fallen below a threshold number; and
- a system for reassigning each computing device in the sub-group to a new sub-group.

7. The computer infrastructure of claim 6, wherein the new sub-group includes at least one computing device that is included in at least one additional sub-group.

8. The computer infrastructure of claim 1, wherein the system for managing a trust level for communications between another computing device in the set of computing devices and other computing devices isolates a particular computing device from communicating with other computing devices in response to a failure of the particular computing device.

9. A computer infrastructure comprising:
- a computing device including:
  - a system for managing a set of computing devices in the computer infrastructure that evaluate a trustworthiness of one another, the system for managing including a system for managing membership in a sub-group of the computer infrastructure; wherein the system for managing membership in the sub-group of the computer infrastructure includes:
    - a system for detecting that a threshold number of computing devices has been exceeded for at least one of: the computer infrastructure or a sub-group of the computer infrastructure; and
    - a system for dividing the at least one of: the computer infrastructure or the sub-group of the computer infrastructure into a plurality of sub-groups of computing devices for evaluating trust.

10. The computer infrastructure of claim 9, the system for managing a set of computing devices further including a system for managing a trust level for communications between another computing device in the computer infrastructure and other computing devices.

11. The computer infrastructure of claim 9, the system for dividing assigning at least one computing device in the computer infrastructure to a plurality of sub-groups.

12. The computer infrastructure of claim 9, wherein the threshold number is selected based on an impact of the monitoring on a performance of a primary function of each computing device.

13. The computer infrastructure of claim 9, the system for managing membership in a sub-group of the computer infrastructure including:
- a system for detecting that a number of computing devices in a sub-group of the computer infrastructure has fallen below a threshold number; and
- a system for reassigning each computing device in the sub-group to a new sub-group.

14. The computer infrastructure of claim 13, wherein the new sub-group includes at least one computing device that is included in at least one additional sub-group.

15. A computer infrastructure comprising:
- a computing device including:
  - a system for managing a set of computing devices in the computer infrastructure that evaluate a trustworthiness of one another, the system for managing including a system for managing a trust level for communications between another computing device in the computer infrastructure and other computing devices, wherein the system for managing the trust level for communications between another computing device in the set of computing devices and other computing devices isolates a particular computing device from communicating with other computing devices in response to a failure of the particular computing device.

16. The computer infrastructure of claim 15, the system for managing a set of computing devices further including a system for enabling a user to modify a set of reference measurements used to determine a corresponding trust level for a computing device.

17. The computer infrastructure of claim 15, the system for managing a set of computing devices further including a system for communicating an updated set of reference measurements to other computing devices in the computer infrastructure.

* * * * *